United States Patent
Gliner et al.

(10) Patent No.: US 12,472,094 B2
(45) Date of Patent: Nov. 18, 2025

(54) PHACOEMULSIFICATION PROBE COMPRISING MAGNETIC SENSORS AND/OR MULTIPLE INDEPENDENT PIEZOELECTRIC VIBRATORS

(71) Applicant: JOHNSON & JOHNSON SURGICAL VISION, INC., Irvine, CA (US)

(72) Inventors: Vadim Gliner, Haifa (IL); Assaf Govari, Haifa (IL); Christopher Thomas Beeckler, Brea, CA (US); Joseph Thomas Keyes, Sierra Madre, CA (US)

(73) Assignee: Johnson & Johnson Surgical Vision, Inc., Irvine, CA (US)

( * ) Notice: Subject to any disclaimer, the term of this patent is extended or adjusted under 35 U.S.C. 154(b) by 692 days.

(21) Appl. No.: 17/324,576

(22) Filed: May 19, 2021

(65) Prior Publication Data
US 2021/0361481 A1 Nov. 25, 2021

Related U.S. Application Data

(60) Provisional application No. 63/028,098, filed on May 21, 2020.

(51) Int. Cl.
*A61F 9/007* (2006.01)
*A61B 17/00* (2006.01)

(52) U.S. Cl.
CPC .............. *A61F 9/00745* (2013.01); *A61B 2017/00039* (2013.01)

(58) Field of Classification Search
CPC ....... A61F 9/00745; A61B 2017/00039; A61B 34/73; A61B 2017/320098; A61B 17/320068
See application file for complete search history.

(56) References Cited

U.S. PATENT DOCUMENTS

| 2,434,480 A | 1/1948 | Anderson |
| 3,941,122 A | 3/1976 | Jones |

(Continued)

FOREIGN PATENT DOCUMENTS

| CN | 109029690 A | 12/2018 |
| CN | 111557784 B | 11/2020 |

(Continued)

OTHER PUBLICATIONS

Wikimedia Foundation. (Oct. 23, 2023). Linear variable differential transformer. Wikipedia. https://en.wikipedia.org/wiki/Linear_variable_differential_transformer (Year: 2023).*

(Continued)

*Primary Examiner* — Andrew Restaino

(57) ABSTRACT

A phacoemulsification device includes a phacoemulsification probe and a processor. The phacoemulsification probe includes a piezoelectric crystal configured to vibrate in response to a drive signal, a needle configured to be inserted into a lens capsule of an eye and to be vibrated by the piezoelectric crystal, and a set of magnetic-field components. The set includes (i) one or more magnetic-field generators configured to generate a magnetic field, and (ii) one or more magnetic-field sensors configured to sense the magnetic field. At least one of the magnetic-field components is coupled to vibrate with the needle and at least one other of the magnetic-field components is isolated from vibration of the needle, thereby causing the magnetic-field sensors to output signals indicative of the vibration. The processor is configured to adaptively adjust a frequency of the drive signal so as to vibrate the needle at a resonant frequency of the piezoelectric crystal.

7 Claims, 5 Drawing Sheets

(56) References Cited

U.S. PATENT DOCUMENTS

| | | |
|---|---|---|
| 3,964,487 A | 6/1976 | Judson |
| 3,990,452 A | 11/1976 | Murry et al. |
| 4,126,137 A | 11/1978 | Archibald |
| 4,184,510 A | 1/1980 | Murry et al. |
| 4,808,948 A | 2/1989 | Patel et al. |
| 4,827,911 A | 5/1989 | Broadwin et al. |
| 4,849,872 A | 7/1989 | Gassler |
| 4,861,332 A | 8/1989 | Parisi |
| 4,954,960 A | 9/1990 | Lo et al. |
| 4,970,656 A | 11/1990 | Lo et al. |
| 4,983,901 A | 1/1991 | Lehmer |
| 5,001,649 A | 3/1991 | Lo et al. |
| 5,026,387 A | 6/1991 | Thomas |
| 5,062,827 A | 11/1991 | Wiksell |
| 5,160,317 A | 11/1992 | Costin |
| 5,162,044 A | 11/1992 | Gahn et al. |
| 5,209,221 A | 5/1993 | Riedlinger |
| 5,279,547 A | 1/1994 | Costin |
| 5,318,563 A | 6/1994 | Malis et al. |
| 5,331,951 A | 7/1994 | Kepley |
| 5,370,602 A | 12/1994 | Kepley |
| 5,388,569 A | 2/1995 | Kepley |
| 5,406,503 A | 4/1995 | Williams, Jr. et al. |
| 5,417,246 A | 5/1995 | Perkins et al. |
| 5,431,664 A | 7/1995 | Ureche et al. |
| 5,453,087 A | 9/1995 | Malinowski |
| 5,520,633 A | 5/1996 | Costin |
| 5,547,459 A | 8/1996 | Kaufman et al. |
| 5,582,578 A | 12/1996 | Zhong et al. |
| 5,591,127 A | 1/1997 | Barwick, Jr. et al. |
| 5,700,240 A | 12/1997 | Barwick, Jr. et al. |
| 5,733,256 A | 3/1998 | Costin |
| 5,800,365 A | 9/1998 | Zhong et al. |
| 5,808,396 A | 9/1998 | Boukhny |
| 5,843,109 A | 12/1998 | Mehta et al. |
| 5,852,794 A | 12/1998 | Staggs |
| 5,979,494 A | 11/1999 | Perkins et al. |
| 5,997,528 A | 12/1999 | Bisch et al. |
| 6,010,496 A | 1/2000 | Appelbaum et al. |
| 6,161,545 A | 12/2000 | Chow |
| 6,203,516 B1 | 3/2001 | Kepley |
| 6,394,974 B1 | 5/2002 | Kadziauskas et al. |
| 6,402,769 B1 | 6/2002 | Boukhny |
| 6,740,058 B2 | 5/2004 | Lal et al. |
| 6,986,753 B2 | 1/2006 | Bui |
| 6,997,935 B2 | 2/2006 | Anderson et al. |
| 7,554,343 B2 | 6/2009 | Bromfield |
| 7,713,202 B2 | 5/2010 | Boukhny et al. |
| 7,758,538 B2 | 7/2010 | Boukhny et al. |
| 7,811,255 B2 | 10/2010 | Boukhny et al. |
| 8,195,286 B2 | 6/2012 | Kadziauskas et al. |
| 8,303,613 B2 | 11/2012 | Crandall et al. |
| 8,439,938 B2 | 5/2013 | Moore, Jr. |
| 8,610,334 B2 | 12/2013 | Bromfield |
| 9,018,887 B2 | 4/2015 | Paschke |
| 9,050,627 B2 | 6/2015 | Jacobson |
| 9,393,152 B2 | 7/2016 | Wong et al. |
| 9,433,723 B2 | 9/2016 | Steen et al. |
| 10,052,227 B2 | 8/2018 | Saimovici |
| 10,182,940 B2 | 1/2019 | Chandrakant et al. |
| 10,363,166 B2 | 7/2019 | Raney |
| 10,478,336 B2 | 11/2019 | Bromfield et al. |
| 10,478,533 B2 | 11/2019 | Borgmeier et al. |
| 10,596,032 B2 | 3/2020 | Raney |
| 10,596,033 B2 | 3/2020 | Urich et al. |
| 10,857,030 B2 | 12/2020 | Raney |
| 2001/0003155 A1 | 6/2001 | Rockley et al. |
| 2002/0193817 A1 | 12/2002 | Lal et al. |
| 2003/0199997 A1* | 10/2003 | Gao ........................ G05B 5/01 |
| | | 700/1 |
| 2004/0092921 A1 | 5/2004 | Kadziauskas et al. |
| 2006/0079788 A1 | 4/2006 | Anderson et al. |
| 2006/0195077 A1 | 8/2006 | Kadziauskas et al. |
| 2009/0005712 A1 | 1/2009 | Raney |
| 2009/0118751 A1 | 5/2009 | Wiener et al. |
| 2010/0010395 A1 | 1/2010 | Gagnepain et al. |
| 2010/0069825 A1 | 3/2010 | Raney |
| 2010/0160852 A1* | 6/2010 | Moore, Jr. ......... A61F 9/00745 |
| | | 604/22 |
| 2011/0196404 A1 | 8/2011 | Dietz et al. |
| 2012/0022434 A1 | 1/2012 | Lue et al. |
| 2012/0065578 A1 | 3/2012 | Zhou |
| 2012/0072197 A1 | 3/2012 | Ovchinnikov |
| 2012/0143233 A1 | 6/2012 | Sinelnikov |
| 2012/0150075 A1* | 6/2012 | Ludwin ................ A61B 5/062 |
| | | 600/11 |
| 2012/0232466 A1 | 9/2012 | Kuebler et al. |
| 2013/0012868 A1 | 1/2013 | Gordon et al. |
| 2013/0057253 A1* | 3/2013 | Jacobson ............ A61F 9/00745 |
| | | 324/76.77 |
| 2013/0131692 A1 | 5/2013 | Kadziauskas et al. |
| 2013/0314077 A1 | 11/2013 | Okada et al. |
| 2013/0331872 A1 | 12/2013 | Parham et al. |
| 2014/0024969 A1 | 1/2014 | Govari et al. |
| 2014/0163455 A1 | 6/2014 | Wilson et al. |
| 2014/0257172 A1 | 9/2014 | Yalamanchili |
| 2015/0133950 A1* | 5/2015 | Shelton .............. A61B 17/2202 |
| | | 606/128 |
| 2016/0346519 A1* | 12/2016 | Bagwell ............. A61B 17/3401 |
| 2017/0312129 A1 | 11/2017 | Kadziauskas et al. |
| 2018/0207330 A1 | 7/2018 | Ovchinnikov et al. |
| 2019/0059980 A1 | 2/2019 | Shelton, IV et al. |
| 2019/0099547 A1 | 4/2019 | Mehta et al. |
| 2019/0133822 A1 | 5/2019 | Banko |
| 2019/0321017 A1 | 10/2019 | Christopher et al. |
| 2019/0321222 A1 | 10/2019 | Lieu |
| 2020/0100851 A1 | 4/2020 | Marcuk |
| 2020/0353133 A1* | 11/2020 | Gao ........................ A61F 9/007 |
| 2022/0160543 A1 | 5/2022 | Gliner et al. |
| 2022/0192878 A1 | 6/2022 | Algawi et al. |
| 2022/0331159 A1 | 10/2022 | Gliner |
| 2023/0149213 A1 | 5/2023 | Fuchs |
| 2023/0338190 A1 | 10/2023 | Fuchs et al. |

FOREIGN PATENT DOCUMENTS

| | | |
|---|---|---|
| DE | 232755 A1 | 2/1986 |
| DE | 3910200 A1 | 10/1990 |
| EP | 0270819 A2 | 6/1988 |
| EP | 0955984 B1 | 4/2004 |
| EP | 1990032 A1 | 11/2008 |
| EP | 3146946 A1 | 3/2017 |
| EP | 3007660 B1 | 5/2017 |
| IE | 920003 A1 | 7/1992 |
| JP | H0796000 A | 4/1995 |
| JP | H096000 A | 1/1997 |
| JP | 2765803 B2 | 6/1998 |
| WO | 0064388 A1 | 11/2000 |
| WO | 0152782 A1 | 7/2001 |
| WO | 2009073859 A1 | 6/2009 |
| WO | 2016191517 A1 | 12/2016 |

OTHER PUBLICATIONS

Nyquist-Shannon sampling theorem. Nyquist-Shannon sampling theorem—Wikipedia. (Jan. 2019). https://web.archive.org/web/20190118044352/https://en.wikipedia.org/wiki/Nyquist%E2%80%93Shannon_sampling_theorem (Year: 2019).*

Leang K.K., et al., "Feedback-Linearized Inverse Feedforward for Creep, Hysteresis, and Vibration Compensation in AFM Piezoactuators," IEEE Transactions on Control Systems Technology, Sep. 1, 2007, vol. 15(5), pp. 927-935.

Edelman S., et al.,"A Stroboscopic Vibration Analyzer," Journal of Research of the National Bureau of Standards—C. Engineering and Instrumentation, Oct.-Dec. 1959, vol. 63C (2), pp. 97-103.

Baggia S., "Double-frequency Stroboscopic Method for Absolute Calibration of Vibration Transducers," Journal of Sound and Vibration, 1972, vol. 20 (1), pp. 59-69.

Castellanos-Gomez A., et al., "Calibration of Piezoelectric Positioning Actuators Using a Reference Voltage-to-displacement Transducer Based on Quartz Tuning Forks," arXiv preprint arXiv:1203.5767, 2012, 9 pages.

(56) References Cited

OTHER PUBLICATIONS

Chu., et al., "Ins and Outs, Get the Most Out of Today's Advanced Phaco Systems", Cataract & Refractive Surgery Today, Jan. 2016, pp. 40-45.
Zhu et al., "Modeling of piezoelectric stack actuators considering bonding layers" Nov. 2015; Journal of Intelligent Material Systems and Structures; vol. 26; Issue 17; pp. 2418-2427. (Year: 2015).

* cited by examiner

PHACOEMULSIFICATION PROBE COMPRISING MAGNETIC SENSORS AND/OR MULTIPLE INDEPENDENT PIEZOELECTRIC VIBRATORS

CROSS-REFERENCE TO RELATED APPLICATIONS

This application claims the benefit of U.S. Provisional Patent Application 63/028,098, filed May 21, 2020, whose disclosure is incorporated herein by reference.

FIELD OF THE INVENTION

The present invention relates generally to piezoelectric-vibration-based medical devices, and particularly to phacoemulsification systems.

BACKGROUND OF THE INVENTION

A cataract is a clouding and hardening of the eye's natural lens, a structure which is positioned behind the cornea, iris and pupil. The lens is mostly made up of water and protein and as people age these proteins change and may begin to clump together obscuring portions of the lens. To correct this, a physician may recommend phacoemulsification cataract surgery. In the procedure, the surgeon makes a small incision in the sclera or cornea of the eye. Then a portion of the anterior surface of the lens capsule is removed to gain access to the cataract. The surgeon then uses a phacoemulsification probe, which has an ultrasonic handpiece with a needle. The tip of the needle vibrates at ultrasonic frequency to sculpt and emulsify the cataract while a pump aspirates particles and fluid from the eye through the tip. Aspirated fluids are replaced with irrigation of a balanced salt solution (BSS) to maintain the anterior chamber of the eye. After removing the cataract with phacoemulsification, the softer outer lens cortex is removed with suction. An intraocular lens (IOL) is then introduced into the empty lens capsule restoring the patient's vision.

Various techniques to monitor ultrasonic vibration were proposed in the patent literature. For example, Chinese Patent Application Publication CN 109029690 describes a multi-purpose ultrasound vibration amplitude measurement method and device of a vibrating tool head based on electromagnetic induction principle. The device includes two co-axial coils and a permanent magnet. As the tool head is moved with a given speed in a magnetic field generated by the permanent magnet, gained voltage and current signal are measured using the coils, and a faint mechanical oscillation of the head is detected and amplified, thereby greatly reducing measurement error.

As another example, German Patent Application Publication DD 232755 describes a method for the electronic measurement of ultrasonic vibration amplitudes that serve to enable or to improve the measurement of the ultrasonic vibration amplitude of a tool end face. The proposed method can be used both in ultrasonic drilling and in other ultrasonic ablation methods and their combinations with electrochemical removal. The invention involves measuring the acceleration of an oscillating system with an acceleration sensor, and integrating a generated electrical signal obtained twice and then supplying it to a peak value signal meter. As a result, the removal process is easier to control and monitor. Moreover, it is known that the oscillation amplitude can be measured inductively by means of a permanent magnet which produces amplitude-proportional measuring signals in a fixed coil. However, inductive solutions are sensitive to interference fields and interference with corrosion effects.

German Patent Application Publication DE 3910200 describes a device for measuring ultrasonic amplitudes which are generated by an electromechanical resonance transducer which operates in the longitudinal vibration mode, and which are transmitted via a working tool into the effective medium or to the effective location, when an exact indication and evaluation of ultrasonic amplitudes is required for a working tool. According to the invention, the longitudinal oscillations of the transducer cause a periodic alteration of a resonant loop frequency of a RF-oscillator by means of a ring-shaped coil (coupling loop). The electrical alternating voltage produced is related to the actual ultrasonic amplitude occurring at the tip of the working tool.

U.S. Patent Application Publication 2013/0314077 describes a displacement measurement device that includes: a metal object movable in a moving direction within a moving plane; a measurement coil arranged such that an opposite area of a measurement coil surface opposite to the moving plane is varied with a movement of the metal object; and a correction coil arranged such that an opposite area of a correction coil surface to the moving plane is not varied irrespective of the movement of the metal object. The measurement coil and the correction coil are arranged such that the measurement coil surface and the correction coil surface are not overlapped with each other with regard to a plane parallel to the moving plane but a range occupied by the measurement coil in a coordinate axis along the moving direction and a range occupied by the correction coil in the coordinate axis are overlapped with each other.

U.S. Pat. No. 9,018,887 describes an ultrasonic electromechanical resonant system and instrument that provides improvements in the design and implementation of a feedback system. The disclosed configuration and orientation of coils enhance the motional or velocity feedback signals while minimizing the effects of transformer coupling. A two coil and a three-coil approach is disclosed that takes advantage of non-homogeneous magnetic fields. An asymmetrical arrangement enables velocity signals to be coupled into the coils without requiring additional signal conditioning or capacitive elements.

Various techniques to vibrate a phacoemulsification needle of a probe were proposed in the patent literature. For example, U.S. Pat. No. 6,402,769 describes a torsional ultrasound handpiece having at least one set of piezoelectric elements. The piezoelectric elements are constructed of segments that produce both longitudinal and torsional motion. An appropriate ultrasound driver drives the set of elements at the respective resonant frequencies to product longitudinal vibration and torsional oscillation. In an embodiment, two different sets of crystals vibrate ultrasonically in response to a signal generated by ultrasound generator. One set of crystals is polarized to produce torsional motion. Another set of crystals is polarized to produce longitudinal motion.

As another example, U.S. Pat. No. 8,303,613 describes a Langevin transducer horn that uses split electroding or selective electroding of transducer elements and phase relationships of the voltages applied thereto to determine the relative longitudinal and flexural/transverse motion induced in the tip of the horn. In an embodiment, an ultrasonic surgical instrument is provided, that includes a piezoelectric transducer element attached to the horn such that excitation of the piezoelectric element using one of the above electroding causes vibration of a working member of the horn.

SUMMARY OF THE INVENTION

An embodiment of the present invention that is described hereinafter provides a phacoemulsification device including a phacoemulsification probe and a processor. The phacoemulsification probe includes (a) a piezoelectric crystal configured to vibrate in response to a drive signal, (b) a needle configured to be inserted into a lens capsule of an eye and to be vibrated by the piezoelectric crystal, and (c) a set of magnetic-field components. The set includes (i) one or more magnetic-field generators configured to generate a magnetic field, and (ii) one or more magnetic-field sensors configured to sense the magnetic field. At least one of the magnetic-field components is coupled to vibrate with the needle and at least one other of the magnetic-field components is isolated from vibration of the needle, thereby causing the magnetic-field sensors to output signals indicative of the vibration. The processor is configured to adaptively adjust a frequency of the drive signal so as to vibrate the needle at a resonant frequency of the piezoelectric crystal.

In some embodiments, the outputted signals are indicative of at least one of an amplitude and a direction of the vibration of the needle.

In some embodiments, at least one of the magnetic-field components in the set includes a coil wound around a distal end of a horn of the phacoemulsification probe.

In an embodiment, at least one of the magnetic-field components in the set is placed off a longitudinal axis of a horn of the phacoemulsification probe.

In an embodiment, the phacoemulsification probe further includes a horn, wherein the horn is coupled with the needle, and wherein at least one of the magnetic-field components is placed off a longitudinal axis of the horn.

In another embodiment, the magnetic-field components include one or more permanent magnets.

In some embodiments, the processor is further configured to calculate a derivative of the outputted signals with respect to time, and, in response to detecting that the derivative exceeds a given threshold, indicate to a user that the needle is engaging ocular media.

There is additionally provided, in accordance with another embodiment of the present invention, a phacoemulsification device including a phacoemulsification probe and a processor. The phacoemulsification probe includes two or more piezoelectric crystals, each excited in a single respective resonant mode in response to a respective drive signal. The phacoemulsification probe further includes a needle configured to be inserted into a lens capsule of an eye and to be vibrated by the two or more piezoelectric crystals. The processor is configured to adaptively adjust a respective frequency of each drive signal so as to excite each of the two or more piezoelectric crystals in the single respective resonant mode only.

In some embodiments, at least two of the piezoelectric crystals are mutually orthogonal to one another.

In an embodiment, the two or more piezoelectric crystals are stacked on one another along a longitudinal axis of the phacoemulsification probe, and the phacoemulsification device further includes, for each piezoelectric crystal in the stack, multiple electrodes that are configured, when driven by the processor, to excite multiple respective angular sections of the piezoelectric crystal.

In another embodiment, the two or more piezoelectric crystals are sector-shaped and are attached to one another surrounding a longitudinal axis of the phacoemulsification probe.

In some embodiments, the processor is configured to excite the two or more piezoelectric crystals so as to vibrate the needle in a circular, elliptical, or helical trajectory around a longitudinal axis of the phacoemulsification probe.

In some embodiments, the processor is configured to adaptively adjust the frequency of each drive signal independently of any other drive signal.

In an embodiment, the phacoemulsification probe further includes a horn, the horn is coupled with the needle, and the two or more piezoelectric crystals are coupled with the horn.

There is further provided, in accordance with another embodiment of the present invention, a phacoemulsification method. The method includes energizing a piezoelectric crystal of the phacoemulsification probe using a drive signal, and vibrating a needle of the phacoemulsification probe by the energized piezoelectric crystal. Signals, which are indicative of vibration of the needle, are output using a set of magnetic-field components. The set includes (i) at least one magnetic-field generator configured to generate a magnetic field, and (ii) at least one magnetic-field sensor configured to sense the magnetic field. One of the at least one of the magnetic-field generator or the at least one magnetic-field sensor is coupled with the needle to vibrate the needle and wherein the other one of the at least one of the magnetic-field generator or the at least one magnetic-field sensor is isolated from vibration of the needle. A frequency of the drive signal is adaptively adjusted so as to vibrate the needle at a resonant frequency of the piezoelectric crystal.

There is further yet provided, in accordance with another embodiment of the present invention, a method for operating a phacoemulsification probe. The method includes exciting two or more piezoelectric crystals of the phacoemulsification probe, each piezoelectric crystal excited in a single resonant mode using a respective drive signal. A needle of the phacoemulsification probe is vibrated by the two or more piezoelectric crystals. A respective frequency of each drive signal is adaptively adjusted, so as to excite each of the two or more piezoelectric crystals in the single respective resonant mode only.

There is further provided, in accordance with another embodiment of the present invention, a phacoemulsification device including a phacoemulsification probe and a processor. The phacoemulsification probe includes (a) two or more piezoelectric crystals, each crystal excited in response to a respective drive signal, and (b) a needle configured to be inserted into a lens capsule of an eye and to be vibrated by the two or more piezoelectric crystals. The processor is configured to (i) vibrate the needle in a longitudinal vibration mode, (ii) in response to sensing an occlusion of the needle, switch to vibrating the needle in a transverse, circular, elliptical, or helical vibration mode. Further aspects of vibrating a needle in longitudinal and non-longitudinal modes are described in U.S. Pat. No. 10,363,166, whose disclosure is incorporated herein by reference.

There is furthermore provided, in accordance with another embodiment of the present invention, a method for operating a phacoemulsification probe, the method including energizing two or more piezoelectric crystals of the phacoemulsification probe using respective drive signals. A needle of the phacoemulsification probe is vibrated by the energized piezoelectric crystals in a longitudinal vibration mode. In response to sensing an occlusion, a switch is made to vibrate the needle in a transverse vibration mode.

The present invention will be more fully understood from the following detailed description of the embodiments thereof, taken together with the drawings in which:

DETAILED DESCRIPTION OF EMBODIMENTS

Overview

Figure 1:
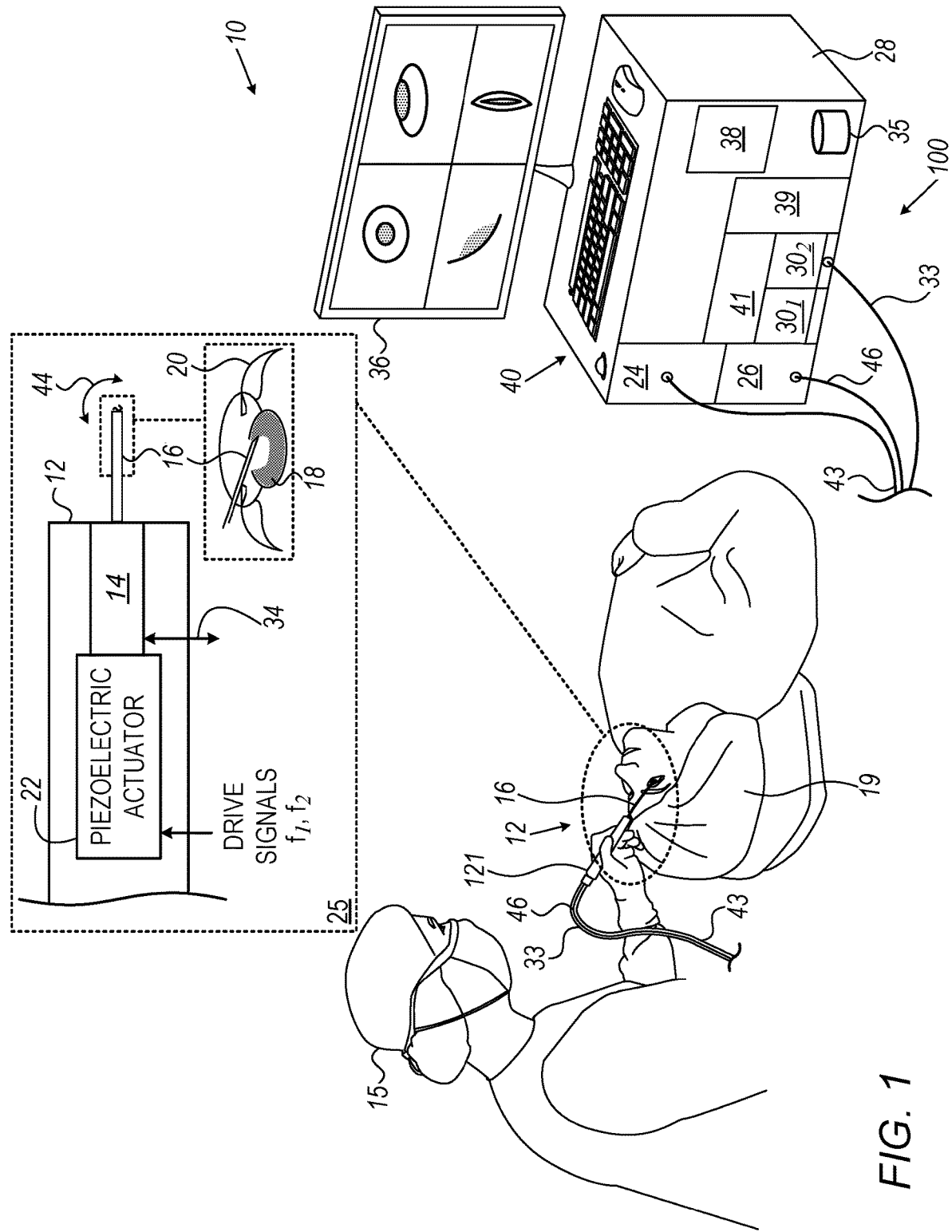
FIG. 1 is a pictorial view, along with a block diagram, of a phacoemulsification apparatus comprising a phacoemulsification probe comprising magnetic sensors and two independent piezoelectric vibrators, in accordance with an embodiment of the present invention.

A phacoemulsification system typically drives a piezoelectric actuator fitted in a phacoemulsification probe ("handpiece") to vibrate a needle during a cataract procedure. The piezoelectric actuator of the phacoemulsification probe may be designed to vibrate in one or more resonant modes of its one or more respective piezoelectric crystals, where each mode has a given "natural" resonant frequency. For example, a multi-resonance mode might yield a complex vibration profile that combines longitudinal, transverse, and torsion vibrations, each with its own resonant frequency. Such a mode may have a complex customizable vibration profile that may allow a physician to better perform phacoemulsification.

In order to vibrate a piezoelectric crystal efficiently, the frequency of the respective drive signal should match the resonance frequency of the piezoelectric crystal. The resonance frequency of the crystal, however, may change due to mechanical load on the needle, such as load applied by the ocular media in which the needle vibrates, and/or due to varying crystal temperature. Moreover, interactions among the two or more different vibration modes may further change their natural resonance frequencies. The actual parameters of the vibration, e.g., an amplitude and direction of the needle motion, cannot therefore be determined from the driving frequency. If the drive signal remains at a constant frequency (e.g., matching the natural resonance frequency of the mechanically-unloaded crystal) the vibration efficiency will deteriorate in real life operation.

In particular, the changing (e.g., drifting) frequency results in reduced vibration amplitude, while the increased heat may cause damage to the eye, or discomfort to the surgeon holding the probe.

Embodiments of the present invention that are described hereinafter provide improved methods and systems for driving one or more piezoelectric crystals in a phacoemulsification probe ("handpiece"). The disclosed techniques measure the actual vibration, and in response adapt one or more frequencies of one or more drive signals that drive the one or more piezoelectric crystals. For example, some disclosed techniques measure the amplitude of vibration, and adapt the frequencies of the drive signals to maximize it. In this manner, the one or more frequencies of the drive signals continuously track the actual one or more resonance frequencies of the respective one or more crystals.

In an embodiment, a phacoemulsification device is provided, that includes a phacoemulsification probe and a processor. The phacoemulsification probe includes (a) a piezoelectric crystal configured to vibrate in response to a drive signal, (b) a needle configured for insertion into a lens capsule of an eye and to be vibrated by the piezoelectric crystal, and (c) a set of magnetic-field components, wherein the set comprises (i) one or more magnetic-field generators, such as transmit coils, configured to generate a magnetic field, and (ii) one or more magnetic-field sensors, such as receive coils, configured to sense the magnetic field, wherein at least one of the magnetic-field components is configured to vibrate with the needle and at least one other of the magnetic-field components is isolated from vibration of the needle, thereby causing the magnetic-field sensors to output signals indicative of the vibration. The outputted signals are typically indicative of at least one of an amplitude and a direction of vibration of the needle. The processor is configured to adaptively adjust a frequency of the drive signal so as to vibrate the needle at a resonant frequency of the piezoelectric crystal.

In one embodiment, the vibration amplitude is measured by coupling one or more RF transmit coils and one or more RF receive coils to a horn of the probe, at a distal end and a proximal end of the horn, respectively. The horn is mechanically coupled to one or more piezoelectric crystals which vibrate the horn. The horn, in turn, vibrates the needle. In one example, the one or more RF transmit coils and the one or more RF receive coils are wound around the horn at its opposite ends. The vibration amplitude causes changes in the magnetic flux through the one or more receive coils, which is indicative of an amount of the receive coil's deflection amplitude relative to a longitudinal axis of the probe (The one or more RF transmit coils are coupled such they are not vibrating).

In another embodiment, a subassembly (e.g., a set) of three receive coils is placed off the horn's axis of symmetry (i.e., off the horn's longitudinal axis). For example, the three coils may be spaced azimuthally 120° apart at a same radial distance from the axis. In that way, regardless of the vibration direction, the coils generate a sufficient alternating current (AC) signal (due to experiencing a change in magnetic flux) indicative of the vibration amplitude. Moreover, the three signals are correlated, which enables improvement of the accuracy of the measured vibration amplitude.

In general, a first set of coils (that can be a single coil or any number of coils) is mechanically coupled to the needle, so that they vibrate in synchrony with the vibrated needle. A second set of coils (that can be a single coil or any number of coils) is coupled to be stationary, i.e., mechanically isolated from the vibration of the needle. For example, coils of the second subassembly (e.g., set) are statically disposed off a longitudinal axis of the horn (e.g., equiangularly over a perimeter of a proximal section of the horn), with the coils being parallel to each other and to the coils of the first set, but with any of the coils not being coaxial with another. Alternatively, a second set of coils may be located at a nodal location where there is no motion. Such arrangement results in relative motion between the first and second sets of coils as the needle vibrates. As a result, at least one of the coils experiencing a change in a magnetic flux induced due to needle vibration outputs a signal indicative of at least one of an amplitude and direction of vibration of the needle.

In a further embodiment, a processor calculates a derivative of the outputted signal peak value (caused by needle vibration) with respect to time. If the change in the derivative exceeds a given threshold, the processor concludes that the needle is engaging ocular media (i.e., comes to contact with the cataract lens). A relevant threshold value may be determined in a lab, for example as a change in the derivative caused by inserting the needle into water. For example, an abrupt change in vibration amplitude, (e.g., transient reduction in vibration amplitude, having a predetermined temporal width) indicates that a perturbation to the vibrating needle has just occurred by the needle being moved from air into ocular media.

Furthermore, the above-described set of three coils enables the measurement of a direction of the needle vibration. Readings from the three receive coils provide values for the magnitude and direction of the deflection of the needle vibration. These parameters can be used as feedback values for a control loop to maintain the modes of vibration at resonance. For example, the control loop may minimizes a direction indicative feedback value defined by a norm. Such norm calculates the required direction of vibration vs. the actual direction of vibration (i.e., the control loop acts to minimize such a norm).

The coils are typically operated at 200 kHz, while the resonant vibration frequency is typically ~40 kHz, so there is no interference between the sensing and the driving signals. The coils are operated at a given frequency for a given digital sampling rate. Using a higher sampling frequency of the coil signals allows the two frequencies to be closer one to the other. The analog signals that the one or more transmit coils output are measured using an electronic circuitry and typically subsequently converted to digital signals using an Analog/Digital (A/D) converter. To ensure accurate results, the A/D converter applies a high sampling rate of at least 400 kHz, and possibly up to about 1 MHz and more.

In another embodiment, one or more permanent magnets are used as a transmitter instead of using an RF transmit coil. The one or more magnets are oriented (e.g., the magnetic field lines that the one or more permanent magnets generate are designed such that, as the one or more permanent magnets vibrate on the horn, their vibration induces an AC signal in each of the one or more receive coils where the induced AC signal is indicative of the vibration.

In yet another embodiment the one or more permanent magnets are fixed (e.g., at a proximal base of the horn or at a nodal point), and the receive coils are coupled to a distal end of the horn where they vibrate. Again, the one or more permanent magnets are configured to induce an AC field in each vibrating receive coil indicative of the vibration amplitude and direction.

As noted above, phacoemulsification may use two or more modes of needle vibration in order to carve up the cataract lens of the eye. Such multiple modes may be achieved, for example, by exciting a single piezoelectric crystal with multiple drive frequencies, so that the crystal simultaneously vibrates in resonance in the multiple modes. However, as noted above, the crystal's driving signal frequencies may shift off resonance due to the mechanical coupling between the modes. In addition, the amount of coupling changes, for example, as the crystal temperature changes. Thus, it is difficult to maintain all of the modes in resonance.

Therefore, some embodiments of the present invention that are described hereinafter vibrate the needle using two or more piezoelectric crystals. Each of the crystals is independently driven in only one selected resonant mode. Typically, the drive signal frequency of each mode is different. In an embodiment, the two or more piezoelectric crystals are oriented orthogonally one to the other (up to three crystals).

Some embodiments provide individual processor-controlled drive modules, described below, to drive each a respective resonant-frequency mode of vibration of the two or more piezoelectric crystals. Requiring each crystal to vibrate only in one mode reduces the interaction between the modes, and hence makes it much easier to generate the required vibrations.

In one embodiment, the needle is vibrated by a piezoelectric vibrator comprising a split-electrode single-crystal stack. In another embodiment, the needle is vibrated a piezoelectric vibrator comprising multi-crystal made of angular sections. These two embodiments of a piezoelectric vibrator can assist in clearing an occlusion of the needle. For example, under normal conditions (i.e., in absence of an occlusion) the processor may vibrate the needle using longitudinal vibration. In response to receiving an indication that the inlet of the needle is occluded by a particle (e.g., an indication of low pressure from a pressure sensor on the aspiration line), the processor may switch the needle motion from longitudinal to another needle motion or movement (e.g., rotational, transverse, circular, helical, etc.) to shake the particle free. Switching modes may be accomplished by adding some transverse movement to an already existing longitudinal movement. One such possibility is to create a helical movement. Once the particle is free and the system senses no occlusion, the processor may switch back to vibrate the needle using longitudinal motion.

In one embodiment part of the crystal stack is configured to deliver longitudinal motion and a separate part of the crystal stack is configured to deliver transverse or rotational movement.

System Description

Figure 2:
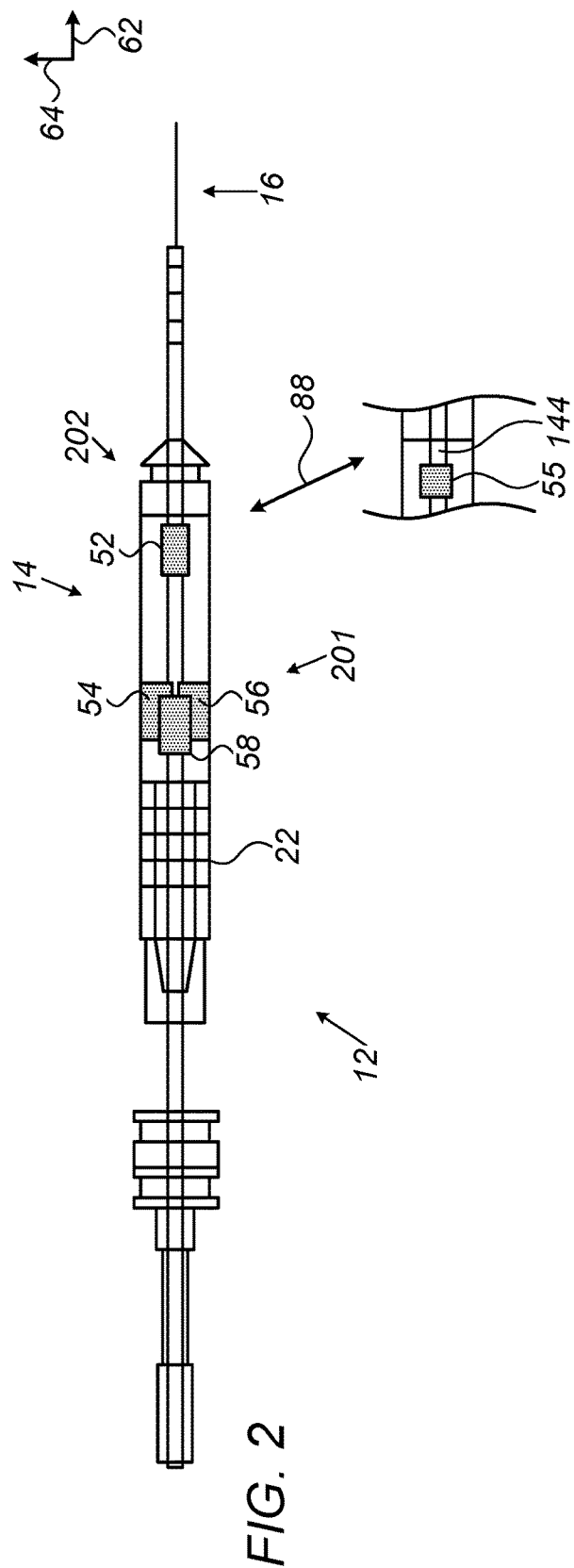
FIG. 2 is a transparent orthogonal view schematically describing a phacoemulsification probe of FIG. 1 (equipped with two sets of magnetic sensors), in accordance with an embodiment of the present invention.
Figure 3:
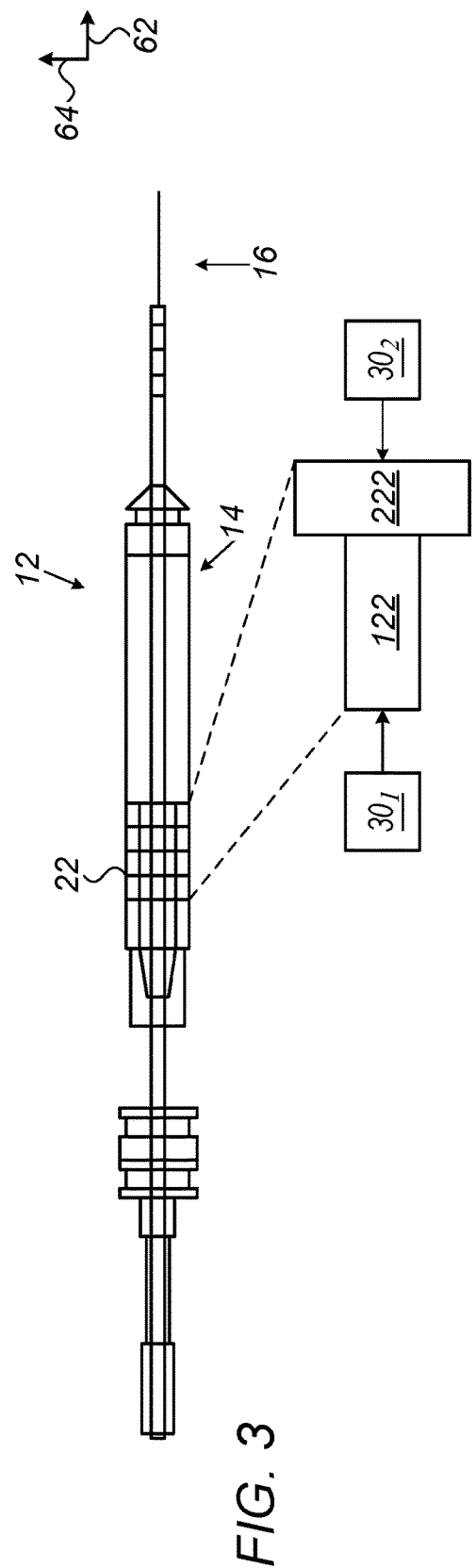
FIG. 3 is a transparent orthogonal view schematically describing a phacoemulsification probe of FIG. 1 (equipped with two independent piezoelectric vibrators), in accordance with an embodiment of the present invention.

FIG. 1 is a pictorial view, along with a block diagram, of a phacoemulsification apparatus 10 comprising a phacoemulsification probe 12 comprising magnetic sensors and two independent piezoelectric vibrators (the sensors and the piezoelectric vibrators are described in FIGS. 2 and 3, respectively), in accordance with an embodiment of the present invention. As seen in the pictorial view of phacoemulsification apparatus 10, and the block diagram in inset 25, it includes a phacoemulsification probe 12 comprising a needle 16 configured for insertion into a lens capsule 18 of an eye 20 of a patient 19 by a physician 15.

Needle 16 is coupled with a horn 14 comprised in probe 12, and is shown in inset 25 as a straight needle. However, any suitable needle may be used with the phacoemulsification probe 12, for example, a curved or bent tip needle commercially available from Johnson & Johnson Surgical Vision, Santa Ana, CA, USA.

A piezoelectric actuator 22 inside probe 12 is configured to vibrate horn 14 and needle 16 in one or more resonant vibration modes of the combined horn and needle element. The vibration of needle 16 is used to break a cataract into small pieces during the phacoemulsification procedure.

The distal end of horn 14 deflects during vibration, and the amplitude and direction of this deflection are used by the disclosed technique to give indications of the actual vibration amplitude and direction of needle 16. The indications are used to control piezoelectric vibration such that needle 16 is continuously vibrated at the resonant (selected) modes.

In the shown embodiment, console 28 comprises a dual-channel piezoelectric drive system 100 comprising drive-modules $30_1$ and $30_2$, each coupled, using electrical wiring running in cable 33, with each one of two piezoelectric crystals (shown in FIG. 3) of actuator 22. Drive modules $30_1$ and $30_2$ are controlled by a processor 38 and convey processor-controlled driving signals via cable 33 to adjust frequencies of a multi-resonance mode of piezoelectric actuator 22 to maintain needle 16 at maximal vibration amplitude of a trajectory 44. Each of the drive modules may be realized in hardware or software, for example, in a proportional-integral-derivative (PID) control architecture.

The direction and amplitude of needle 16 displacement are estimated using magnetic sensors disposed on distal and proximal portions of horn 14, as described in FIG. 2. Driving signals and responsively sensed signals, collectively called hereinafter "signals 34," are conveyed over cable 33 between a magnetic sensing module 39 and the magnetic sensors (shown in FIGS. 2 and 3), where module 39 is controlled by a processor 38, which is also provided with the sensed signals. Processor 38 uses the signals to estimate the direction and amplitude of needle 16, and correspondingly to command piezoelectric drive modules to maintain needle 16 vibration at resonance.

The operation of a magnetic sensing assembly and its use in tissue-tip pressure sensing in the context of probe-based procedures are described in U.S. Patent Application Publication 2014/0024969, which is assigned to the assignee of the present patent application, which document is incorporated by reference. U.S. Patent Application Publication 2014/0024969 describes a joint that couples a distal tip to a distal end of the probe. A joint sensor, contained within the probe, senses a position of the distal tip relative to the distal end of the probe, including axial displacement and angular deflection. The joint sensor includes first and second subassemblies, which are disposed within the probe on opposite, respective sides of the joint and each include one or more magnetic sensors, such as coils, to provide the accurate pressure sensing.

Using a switching circuitry 41, processor 38 is further configured to connect drive-modules $30_1$ and/or $30_2$ to vibrate needle 16 in one of several prespecified trajectories.

Some or all of the functions of processor 38 may be combined in a single physical component or, alternatively, implemented using multiple physical components. These physical components may comprise hard-wired or programmable devices, or a combination of the two. In some embodiments, at least some of the functions of processor 38 may be carried out by suitable software stored in a memory 35. This software may be downloaded to a device in electronic form, over a network, for example. Alternatively, or additionally, the software may be stored in tangible, non-transitory computer-readable storage media, such as optical, magnetic, or electronic memory.

Processor 38 may receive user-based commands via a user interface 40, which may include setting a vibration mode and/or frequency of the piezoelectric actuator 22, adjusting the vibration mode and/or frequency of the piezoelectric actuator 22, setting or adjusting a stroke amplitude of the needle 16, setting or adjusting an irrigation and/or aspiration rate of the pumping sub-system 26. Additionally, or alternatively, processor 38 may receive user-based commands from controls located in handle 121, to, for example, select trajectory 44 or another trajectory for needle 16.

In the shown embodiment, during the phacoemulsification procedure, a pumping sub-system 24 comprised in a console 28 pumps irrigation fluid from an irrigation reservoir to needle 16 to irrigate the eye. The fluid is pumped via a tubing line 43 running from the console 28 to the probe 12. Waste matter (e.g., emulsified parts of the cataract) and eye fluid are aspirated via needle 16 to the collection receptacle by a pumping sub-system 26 also comprised in console 28 and using another tubing line 46 running from probe 12 to console 28.

As seen in FIG. 1, processor 38 may present results of the procedure on a display 36. In an embodiment, user interface 40 and display 36 may be one and the same such as a touch screen graphical user interface.

The apparatus shown in FIG. 1 may include further elements, which are omitted for clarity of presentation. For example, physician 15 typically performs the procedure using a stereo microscope or magnifying glasses, neither of which are shown. Physician 15 may use other surgical tools in addition to probe 12, which are also not shown, in order to maintain clarity and simplicity of presentation.

Phacoemulsification Probe Equipped with Magnetic Sensors

FIG. 2 is a transparent orthogonal view schematically describing a phacoemulsification probe 12 of FIG. 1 (equipped with two subassemblies 201 and 202, of magnetic-field components), in accordance with an embodiment of the present invention. As seen, probe 12 comprises a set of magnetic-field components in a form of coils 52, 54, 56, and 58 to provide accurate reading of the vibration amplitude and direction of needle 16, including its displacement along a planned trajectory, such as trajectory 44 (which may also represent a simple axial trajectory) and its azimuthal direction of deflection. These coils are one type of coils that are used to generate magnetic flux or detect oscillating magnetic flux, that may be used in embodiments of the present invention.

The four coils disposed in probe 12 are divided between two subassemblies on opposite sides of horn 14. One subassembly comprises a single coil, 52, which is coupled with or disposed over a distal end of horn 14, and therefore coil 52 vibrates with horn 14. Coil 52 is driven by a current via wiring running in cable 33 from module 39 to generate a magnetic field. This field is received by a second subassembly, comprising coils 54, 56, and 58, that are fixed relative to probe 12 (i.e., not vibrating with horn 14) and are located in a section of the probe that is spaced axially apart from coil 52. (The term "axial," as used in the context of the present patent application and in the claims, refers to the direction of longitudinal axis 62 of horn 14 at resting position. An axial plane is a plane perpendicular to longitudinal axis 62, and an axial section is a portion of the probe contained between two axial planes.) Coils 54, 56, and 58 emit electrical signals in response to coils 54, 56, and 58 experiencing a changing magnetic flux generated by vibrating coil 52. The electrical signals are conveyed by wiring via cable 33 to module 39 and from there to processor 38, which processes the signals in order to measure the axial displacement and angular deflection of coil 52 and from those of needle 16.

Coils 54, 56, and 58 are fixed in probe 12 at different radial axis (64) locations. (The term "radial" refers to axial coordinates. Axis 64 is also used after to define a transverse direction of vibration, as opposed to a longitudinal direction of vibration along axis 62). Specifically, in this embodiment, coils 54, 56, and 58 are all located in the same axial plane at different azimuthal angles about probe axis 62. For example, the three coils may be spaced azimuthally 120° apart at the same radial distance from the axis.

The axes of symmetry of coils 52, 54, 56, and 58 are parallel to axis 62 (and thus to one another). Consequently, coils 54, 56, and 58 output strong signals in response to the oscillating magnetic flux generated by coil 52, and the signals vary strongly with the distances of coils 54, 56, and 58 from coil 52. (Alternatively, the axis of coil 52 and/or coils 54, 56, and 58 may be angled relative to the probe (e.g., of horn 14) axis, as long as the coil axes have a sufficient parallel component in order to give substantial signals.)

Angular deflection of a distal end horn 14 gives rise to a differential change in the signal output by coils 54, 56, and 58, depending on the direction and magnitude of deflection, since one or two of these coils are relatively closer to moving coil 52. Typically, coils, 56, and 58 are each staggered (i.e., laterally displaced) by several millimeters from coil 52.

Processor 38 analyzes the signal output of coils 54, 56, and 58 in order to measure the deflection and displacement of needle 16. The difference of the changes gives the deflection. The vector direction of the difference gives an indication of the bend direction. A suitable calibration procedure may be used to measure the precise dependence of the signals on deflection of needle 16.

Coils 52, 54, 56, and 58 are typically operated at 200 kHz, while the resonant ultrasound frequency of horn 14 is typically about 40 kHz, and thus there is no interference. The transmit coil signals are typically measured digitally, in an A/D converter, which should have a high sampling rate of at least 400 kHz to ensure good results.

Various other configurations of the coils in the sensing subassemblies may also be used, alternatively to the configuration shown and described above. For example, the positions of the subassemblies may be reversed, so that that field generator coil is fixed, and the sensor coils vibrate with horn 14. As another alternative, coils 54, 56, and 58 may be driven as field generators (using time- and/or frequency-multiplexing to distinguish the fields), while coil 52 serves as the sensor. The sizes and numbers of the coils in FIG. 2 are shown only by way of example, and larger or smaller numbers of coils may similarly be used, in various different positions, so long as one of the subassemblies comprises at least two coils, in different radial positions, to allow differential measurement of joint deflection.

More generally put, the various types of magnetic-field generators (e.g., TX coils or permanent magnets) and magnetic-field sensors (RX coils) are referred to herein collectively as a set of "magnetic-field components." The disclosed techniques can be carried out using any other suitable configuration of a set of magnetic-field components, in which (i) one or more magnetic-field generators are configured to generate a magnetic field, and (ii) one or more magnetic-field sensors are configured to sense the magnetic field, (iii) at least one of the magnetic-field components is coupled to vibrate with the needle, and (iv) at least one other of the magnetic-field components is isolated from vibration of the needle. In such an arrangement, the magnetic-field sensors would output signals indicative of the vibration, enabling processor 38 to adapt the drive-signal frequency.

Prior calibration of the relation between deflection of needle 16 and movement of horn 14 may be used by processor 38 to translate the coil signals into terms of deflection amplitude and direction. The deflection reading is insensitive to temperature variations and free of drift, unlike piezoelectric sensors, for example. Because of the high sensitivity to needle 16 motion that is afforded by the arrangement of coils 52, 54, 56, and 58, processor 38 can measure small displacements and deflections with high precision. Therefore, horn 14 can be made relatively stiff, and processor 38 will still be able to sense and measure accurately the deflection of needle 16. The stiffness of the horn makes it easier for the operator to maneuver and control the phacoemulsification probe.

In another embodiment, coil 52 is replaced (88) with a permanent magnet 55, which, because magnet 55 vibrates (being attached to a distal end of a horn 144), the vibrating permanent magnet 55 induces alternating (e.g., oscillating) magnetic flux in coils 54, 56, and 58 at the mechanical vibration frequency. As a result, coils 54, 56, and 58 output oscillating signals indicative of needle 16 vibration amplitude and direction. In this case, coils 52, 54, 56, and are typically operated at the resonant ultrasound frequency of horn 14 that is typically about 40 kHz, and an interference due to piezo driving signals is addressed in module 39 using appropriate electronic means (e.g., using phase demodulation, assuming that piezo displacement signals lag in a predefined phase relative to piezo-driving signals). The use of permanent magnet 55 may simplify probe 12, and may be worth the effort of overcoming any electronic interference.

The example illustration shown in FIG. 2 is chosen purely for the sake of conceptual clarity. FIG. 2 shows only parts relevant to embodiments of the present invention. Other elements, such as wiring of the magnetic sensors, are omitted.

Phacoemulsification Probe Equipped with Two Independent Piezoelectric Vibrators

FIG. 3 is a transparent orthogonal view schematically describing a phacoemulsification probe 12 of FIG. 1 (equipped with two independent piezoelectric vibrators), in accordance with an embodiment of the present invention.

As seen, piezoelectric actuator 22 comprises two piezoelectric vibrators—crystals 122 and 222, and dual-channel piezoelectric drive system 100 excites each of the crystals independently in a selected resonant mode, typically at different frequencies, using drive-modules $30_1$ and $30_2$. In the shown example, crystal 122 is vibrated in a longitudinal direction 62, whereas crystal 222 is vibrated in an axial direction 64.

By limiting the requirement from each of crystals 122 and 222 to vibrate only in one mode, there is less interaction between the modes, so that it is much easier to generate and control the required vibrations.

Crystals 122 and 222 are wired to be independently driven by two different voltages and frequencies to vibrate, for example, in two mutually orthogonal axes, longitudinal axis 62 and axial axis 64, respectively. To this end, crystals 122 and 222 are oriented mutually orthogonal one to the other. However, other mutually orthogonal axes are possible, e.g., such that the axes are rotated by a given angle relative to axes 62 and 64.

While FIG. 3 shows a piezoelectric actuator 22 comprising two piezoelectric crystals, in general, piezoelectric actuator 22 may comprise more than two piezoelectric crystals. For example, piezoelectric actuator 22 may comprise three independent piezoelectric crystals, each vibrating needle 16 at a spatially different direction (e.g. longitudinal, axial, and torsional). In another embodiment, the three crystals are oriented orthogonally one to the other.

Phacoemulsification Probe Equipped with Piezoelectric Vibrator Comprising Split-Electrode Single-Crystal Stack or Multi-Crystal As noted above, in one embodiment, shown in FIG. 4A below, the needle is vibrated by a piezoelectric vibrator comprising a stack of split-electrode single-crystal elements. In another embodiment, shown in FIG. 4B below, the needle is vibrated a piezoelectric vibrator comprising a multi-crystal element made of angular sections.

Figure 4A:
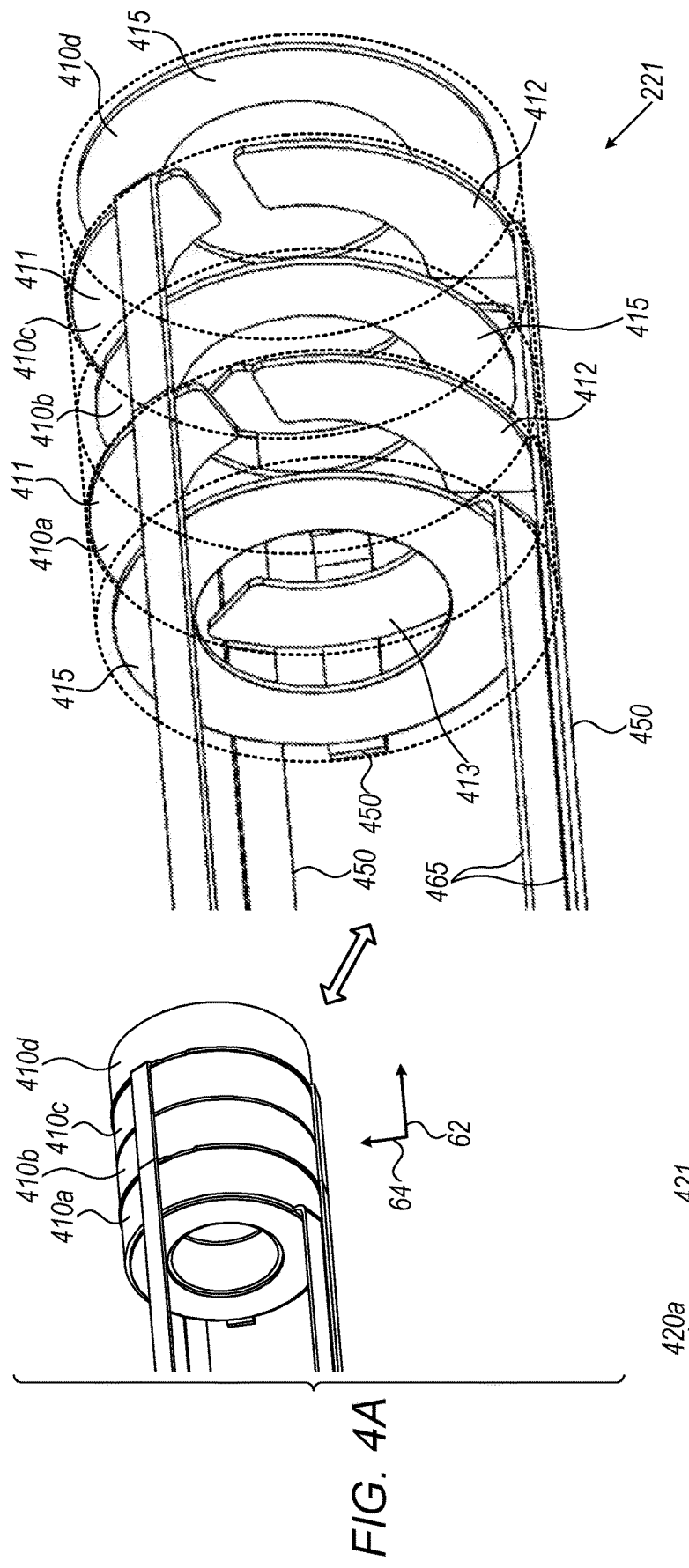
FIGS. 4A and 4B are schematic, pictorial illustrations of a stack of split-electrode single-crystal elements and of a multi-crystal element made of angular crystal sections, respectively, that can be used in the phacoemulsification probe of FIG. 1, in accordance with embodiments of the present invention.
Figure 4B:
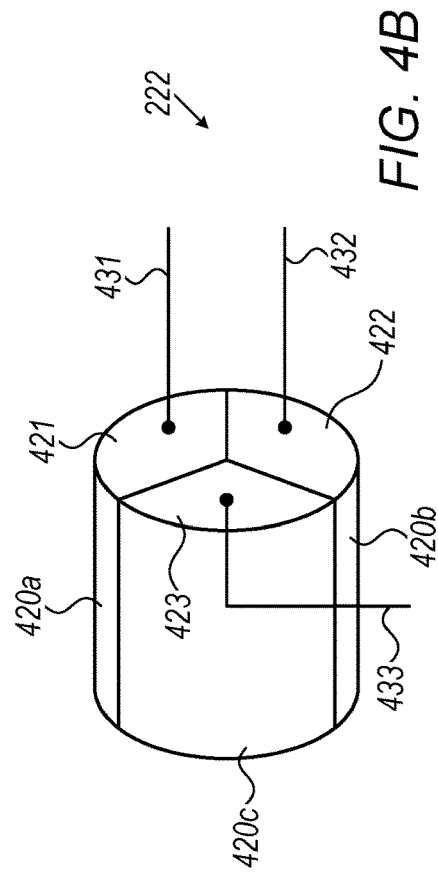

FIGS. 4A and 4B are schematic, pictorial illustrations of a stack 221 of split-electrode single-crystal elements and of a multi-crystal element 222 made of angular crystal sections, respectively, that can be used in phacoemulsification probe 12 of FIG. 1, in accordance with embodiments of the present invention.

As seen in FIG. 4A, split-electrode single-crystal stack 221 is assembled by stacking along longitudinal axis 62 four similar single-crystal piezo elements 410a, 410b, 410c, and 410d, which are angularly aligned. Each of piezo elements 410a, 410b, 410c, and 410d comprises a single-crystal piezo element having an annular cross section. As seen in the larger view on the right-hand side of FIG. 4A, each single-crystal element (with borders shown dotted) is disposed with three electrodes 411, 412 and 413. In a given piezo element (410a, 410b, 410c, or 410d), each of electrodes 411, 412 and 413 is applied to a respective approximately 120° angular section of the piezo element. Also shown are electrical leads 450 for driving the different electrodes of the different angular sections. In some embodiments, processor 38 is configured to drive the various electrodes independently of one another, so as to apply any desired vibration pattern (e.g., a transverse mode of vibration along a transverse plane shown by axis 64). Typically, although not necessarily, processor 38 drives the electrodes of each angular section (across the stack of elements 410a-410d) with the same drive signal.

To drive piezo elements 410a, 410b, 410c, and 410d, each piezo element is disposed with a solid electrode 415 on the opposite side of the piezo element. In an embodiment, the solid electrodes of the different piezo elements are used as common electrical ground, with electrical leads 465, that may be electrically connected one with the other.

In principle, a single thick crystal could be used instead of a stack. In practice, however, a stack such as stack 410a-410d performs better, and is easier to manufacture. As noted above, single-crystal elements 410a-410d are angularly aligned so that the disposed electrode sections are aligned rotationally to act together. To account for any misalignment during assembly the electrode sections are undersized with respect to the metalized surfaces of the crystal elements. Nevertheless, a calibration can be used for the driving waveforms, to correct any residual angular misalignment.

Nevertheless, if the electrode spanned into another metalized region the probe may not perform as desired even using calibration.

Benefits realized the disclosed configuration include:
1) Stacking of multiple single crystals is simpler and achieves better performance than stacking triplets of sector-shaped crystals, e.g., because the top and bottom crystal surfaces are more planar and better aligned.
2) Since each layer of the stack is a single monolithic crystal, there is no need for spacers that may be needed in sector-shaped assemblies.
3) Since each crystal has a well-controlled inner diameter, the risk of placement errors that cause heating is minimized.
4) Since the number of parts in the stack is small, relative to a stack made of triplets of sector-shaped crystals, the assembly process is simple.
5) As the crystals are electrically in parallel with respect to the system, this allows for operation at a lower voltage which makes system and device design easier.

FIG. 4B illustrates an alternative embodiment. In this example, the piezoelectric vibrator comprises multi-crystal element 222 that is made of three angular crystal section elements 420a, 420b and 420c, which are glued together. Angular crystal section elements 420a, 420b and 420c have respective angular section electrodes 421, 422 and 423 disposed thereon. Also shown are respective electrical leads 431, 432 and 433 for driving the different angular section electrodes.

A piezoelectric vibrator comprising a multi-crystal element made of angular sections, such as that of FIG. 4B, is described in U.S. patent application Ser. No. 17/231,450, titled "Compensating for Imperfect Behavior of Multi-Piezoelectric Crystal," Filed Apr. 15, 2021, whose disclosure is incorporated herein by reference.

The examples of piezoelectric vibrator shown in FIGS. 4A and 4B were chosen purely for the sake of conceptual clarity. In general, other configurations may be used, such as, in FIG. 4A, a piezoelectric vibrator made of any two or more number of piezoelectric crystals that are stacked. In FIG. 4B, a piezoelectric vibrator made of any two or more number of piezoelectric crystals are sector-shaped. Thus, the number of angular sections per piezoelectric vibrator may differ from the shown 120-degrees (three sections) example.

Accordingly for FIGS. 4A and 4B, any respective two or more number of electrodes are patterned to energize separately the different piezoelectric crystals.

Additional Electrode Arrangements for Generating Desired Vibration

Figure 5A:
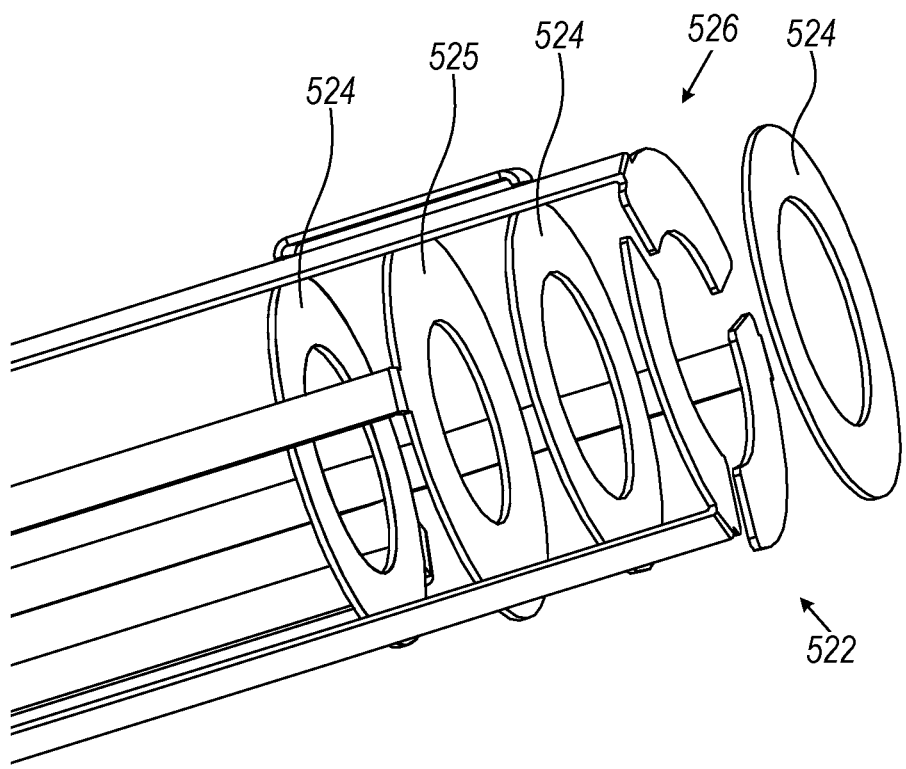
FIGS. 5A and 5B are schematic, pictorial illustrations of a stack of single-crystal elements using either a single split-electrode or two split-electrodes, respectively, in accordance with other embodiments of the present invention.
Figure 5B:
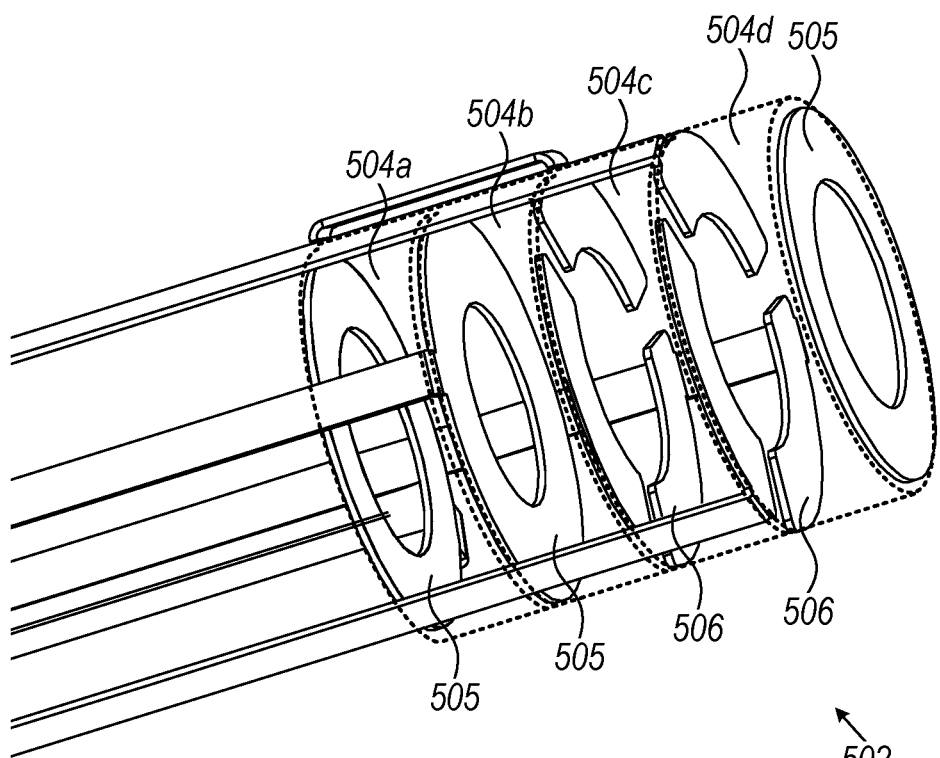

FIGS. 5A and 5B are schematic, pictorial illustrations of stacks 522 and 502 of single-crystal elements using, for driving circular, transverse, helical, and/or rotational motion, either a single split-electrode 526 or two disposed split-electrodes 506, respectively, in accordance with other embodiments of the present invention.

Stacks 522 or 502 can be used, for example, in the phacoemulsification probe of FIG. 1.

In stacks 522 and 502, two crystals (shown in FIG. 5B) are used for inducing a first motion (e.g., longitudinal motion) of the needle. Two other crystals (also shown in FIG. 5B) are used for inducing a second motion (e.g., rotational, transverse, helical, or circular).

In FIG. 5A, of the five electrodes shown, from left to right, electrode serial numbers 1, 3, 5 (i.e., electrodes 524) are connected to electrical ground. The serial number 2 electrode (i.e., electrode 525) is used for driving a first motion or movement (e.g., longitudinal) and serial number 4 electrode (labeled 526) is a split-electrode (split into 3 arcs) used for driving a second motion or movement (e.g., rotational, transverse, helical, or circular) of the needle.

Driving electrodes (524,525,524,526,524) with respective polarities of (−,+,−,+,−), with − denoting ground, allows floating ground to be applied at the two ends and interface with the horn so the needle and handle are grounded. This solution also simplifies wiring.

FIG. 5B shows piezoelectric crystals 504a-504d. In FIG. 5B, there are three full electrodes 505 using dashed lines. As seen, stack 502 is driven using two split-electrodes 506. Electrodes 506 are made by split metallization, which is typically metalized in a similar manner on both sides of crystal 504c. This configuration is beneficial as the manufacturer of the electrodes can utilize the same mask for both sides. Plating the crystal symmetrically with split-electrodes 506 also aids in assembly, as the rotation of the crystal can be seen from above as each piece is placed onto the horn. One of electrodes 506 may later be wired to ground (e.g., by electrically shortcutting the split electrodes of one of electrodes 506).

Figure 6:
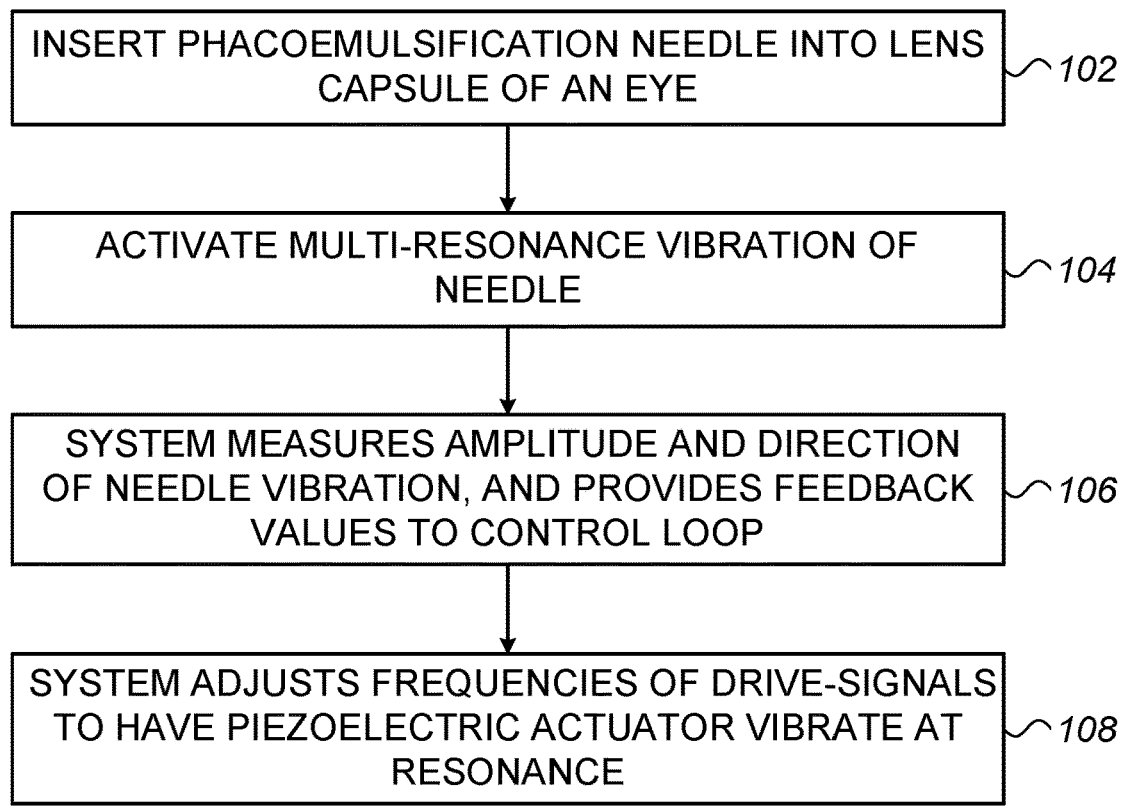
FIG. 6 is a flow chart schematically describing a method for operating the phacoemulsification apparatus of FIG. 1 using the magnetic sensors on the phacoemulsification probe, in accordance with an embodiment of the present invention.

Method of Sensing Amplitude and Direction of Phacoemulsification Needle Vibration FIG. 6 is a flow chart schematically describing a method for operating phacoemulsification apparatus 10 of FIG. 1 using the magnetic sensors on phacoemulsification probe 12, in accordance with an embodiment of the present invention. The algorithm, according to the presented embodiment, carries out a process that begins with physician 15 inserting phacoemulsification needle 16 of probe 12 into a lens capsule 18 of an eye 20, at a needle insertion step 102.

Next, physician 15 activates probe 12, for example using a control over handle 121 or a foot pedal (not shown), to vibrate needle 16 in complex trajectory 44 comprising, for example, a combination of longitudinal, transverse, and/or torsional motion, at a needle vibrating step 104.

Using signals acquired by magnetic sensors 52, 54, 56, and 58, processor 38 measures an amplitude and direction of needle 16 vibration, at a feedback step 106, to use the measured amplitude and direction as inputs to a feedback loop.

Finally, using the feedback loop, processor 38 adjusts frequencies of the drive signals such that the piezoelectric actuator vibrates at resonance, at a vibration controlling step 108, to have piezoelectric actuator 22 (comprising crystals 122 and 222) vibrate at the multiple (selected) resonant frequencies, so as to continue vibrating needle 16 in trajectory 44. For example, in order to maintain vibration in resonance, processor 38 maximizes the amplitude feedback signal, and minimizes another feedback signal made of a norm of the required direction of vibration vs. the actual direction of vibration.

Figure 7:
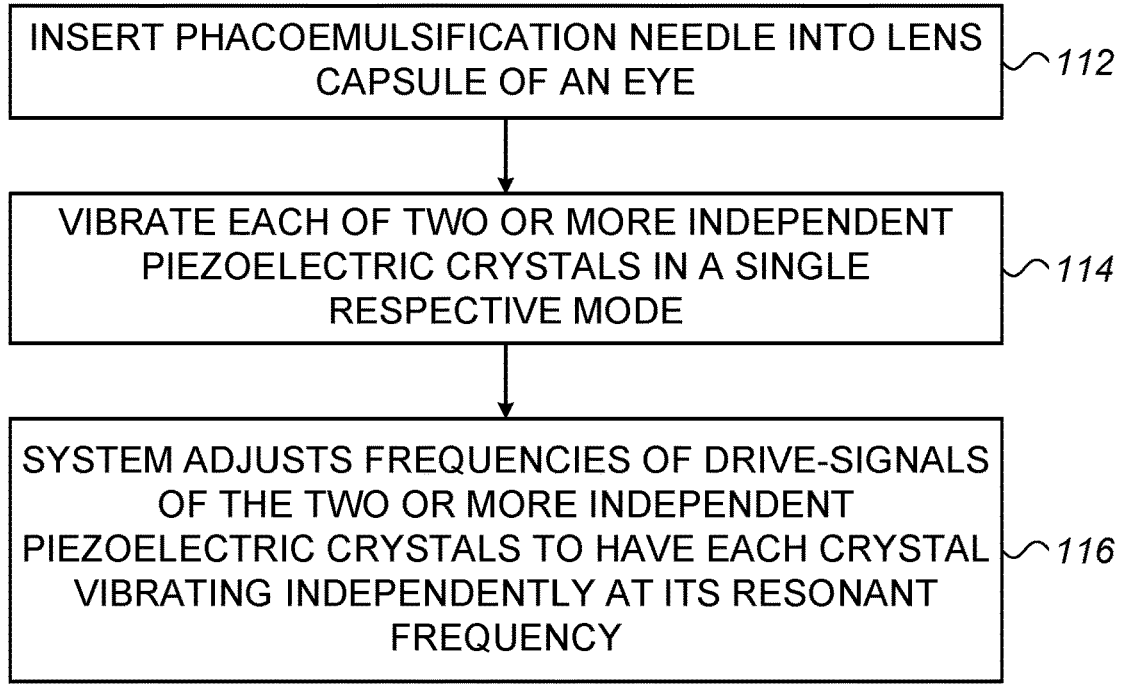
FIG. 7 is a flow chart schematically describing a method for operating the phacoemulsification apparatus of FIG. 1 using the two independent piezoelectric vibrators of the phacoemulsification probe, in accordance with an embodiment of the present invention.

Method of Driving Independent Piezoelectric-Vibrators of a Phacoemulsification Probe FIG. 7 is a flow chart schematically describing a method for operating phacoemulsification apparatus 10 of FIG. 1 using the two independent piezoelectric vibrators of phacoemulsification probe 12, in accordance with an embodiment of the present invention. The algorithm, according to the presented embodiment, carries out a process that begins with physician 15 inserting phacoemulsification needle 16 of probe 12 into a lens capsule 18 of an eye 20, at a needle insertion step 112.

Next, physician 15 activates probe 12, for example using a control over handle 121, to vibrate needle 16, in a needle vibrating step 114. In response, processor 38 commands drive system 100, comprising drive-modules $30_1$ and $30_2$, to generate drive signals to independently drive crystals 122 and 222 of the piezoelectric actuator, respectively, in a selected resonant mode of each crystal, typically at different frequencies.

Finally, at a needle vibration controlling step 116, using some type of feedback loop, processor 38 crystals 122 and 222 adjust the frequencies of the drive signals generated by drive modules $30_1$ and $30_2$, such that each of crystals 122 and 222 vibrate resonantly at its selected mode.

The example flow charts shown in FIGS. 6 and 7 were chosen purely for the sake of conceptual clarity. For example, additional steps, such as cutting, irrigating, and inspecting the eye are omitted for simplicity and clarity of presentation.

Although the embodiments described herein mainly address phacoemulsification, the methods and systems described herein can also be used in other applications that may require a multi-channel piezoelectric resonant system to drive a moving member, such as in surface sensing microscopes that vibrate a tip.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A phacoemulsification device, comprising:
 a phacoemulsification probe having a longitudinal axis, comprising:
  a piezoelectric crystal configured to vibrate in response to a drive signal;
  a needle configured to be inserted into a lens capsule of an eye and to be vibrated by the piezoelectric crystal; and
  a set of magnetic-field components, wherein the set comprises (i) at least one magnetic-field generator configured to generate a magnetic field, and (ii) at least one magnetic-field sensor configured to sense the magnetic field,
  wherein the at least one magnetic-field generator and the at least one magnetic-field sensor are disposed at non-overlapping positions along the longitudinal axis,
  wherein one of the at least one magnetic-field generator or the at least one magnetic-field sensor is configured to vibrate with the needle, and wherein the other one of the at least one magnetic-field generator or the at least one magnetic-field sensor is isolated from vibration of the needle, thereby causing the at least one magnetic-field sensor to output signals indicative of the vibration; and a processor configured to:
- determine a deflection amplitude and direction of the vibration by sampling the output signals at a sampling rate, and
- adaptively adjust a frequency of the drive signal so as to vibrate the needle at a resonant frequency of the piezoelectric crystal based on the amplitude and the direction, wherein the at least one magnetic-field generator is configured to be operated at a frequency of 200 KHz, wherein the frequency of the at least one magnetic-field generator is higher than the resonant frequency of the piezoelectric crystal and is associated with the sampling rate .

2. The phacoemulsification device according to claim 1, wherein the output signals are indicative of at least one of the amplitude and the direction of the vibration of the needle.

3. The phacoemulsification device according to claim 1, wherein the at least one of the magnetic-field components in the set comprises a coil wound around a distal end of a horn of the phacoemulsification probe.

4. The phacoemulsification device according to claim 1, wherein the phacoemulsification probe further comprises a horn, wherein the horn is coupled with the needle, and wherein at least one of the magnetic-field components in the set is placed off a longitudinal axis of the horn.

5. The phacoemulsification device according to claim 1, wherein the magnetic-field components comprise one or more permanent magnets.

6. The phacoemulsification device according to claim 1, wherein the processor is further configured to calculate a derivative of the output signals with respect to time, and, in response to detecting that the derivative exceeds a given threshold, indicate to a user that the needle is engaging ocular media.

7. A method for operating a phacoemulsification probe, the method comprising:
- energizing a piezoelectric crystal of the phacoemulsification probe using a drive signal, wherein the phacoemulsification probe extends along longitudinal axis;
- vibrating a needle of the phacoemulsification probe by the energized piezoelectric crystal;
- outputting signals indicative of vibration of the needle using a set of magnetic-field components, wherein the set comprises (i) at least one magnetic-field generator configured to generate a magnetic field, and (ii) at least one magnetic-field sensor configured to sense the magnetic field, wherein:
- one of the at least one of the magnetic-field generator or the at least one magnetic-field sensor is coupled with the needle to vibrate the needle,
    - the at least one magnetic-field generator and the at least one magnetic-field sensor are disposed at non-overlapping positions along the longitudinal axis
    - and the other one of the at least one of the magnetic-field generator or the at least one magnetic-field sensor is isolated from vibration of the needle;
- determining a deflection amplitude and direction of the vibration by sampling the output signals at a sampling rate; and
- adaptively adjusting a frequency of the drive signal so as to vibrate the needle at a resonant frequency of the piezoelectric crystal, based on the amplitude and direction,
- wherein the at least one magnetic-field generator is configured to be operated at a frequency of 200 KHz, wherein the frequency of the at least one magnetic-field generator is higher than the resonant frequency of the piezoelectric crystal and corresponds to the sampling rate.

* * * * *